(12) United States Patent
Park et al.

(10) Patent No.: US 11,447,886 B2
(45) Date of Patent: Sep. 20, 2022

(54) ELECTROPLATED BEAD WIRE HAVING EXCELLENT OXIDATION RESISTANCE

(71) Applicant: Hongduk Industrial Co., Ltd., Pohang-si (KR)

(72) Inventors: Pyeong Yeol Park, Pohang-si (KR); Ok Shil Park, Busan (KR)

(73) Assignee: Hongduk Industrial Co., Ltd., Pohang-si (KR)

( * ) Notice: Subject to any disclaimer, the term of this patent is extended or adjusted under 35 U.S.C. 154(b) by 0 days.

(21) Appl. No.: 16/977,012

(22) PCT Filed: Feb. 25, 2019

(86) PCT No.: PCT/KR2019/002258
§ 371 (c)(1),
(2) Date: Aug. 31, 2020

(87) PCT Pub. No.: WO2019/177281
PCT Pub. Date: Sep. 19, 2019

(65) Prior Publication Data
US 2021/0002782 A1 Jan. 7, 2021

(30) Foreign Application Priority Data
Mar. 12, 2018 (KR) .................... 10-2018-0028848

(51) Int. Cl.
*C25D 5/00* (2006.01)
*B60C 9/00* (2006.01)
(Continued)

(52) U.S. Cl.
CPC ............ *C25D 5/619* (2020.08); *B60C 9/0007* (2013.01); *C25D 3/12* (2013.01); *C25D 3/38* (2013.01);
(Continued)

(58) Field of Classification Search
None
See application file for complete search history.

(56) References Cited

U.S. PATENT DOCUMENTS

| 4,265,678 A | 5/1981 | Hachisuka et al. |
| 2014/0378597 A1 | 12/2014 | Buytaert et al. |
| 2015/0017467 A1* | 1/2015 | Buytaert ............... C22C 38/001 428/625 |

FOREIGN PATENT DOCUMENTS

| EP | 2 877 630 A1 | 1/2014 |
| EP | 2 877 630 B1 | 10/2018 |

(Continued)

OTHER PUBLICATIONS

International Search Report and Written Opinion (including English translation of ISR), prepared by the Korea Intellectual Patent Office, acting as the International Searching Authority, for International Application PCT/KR2019/002258, dated May 28, 2019.

*Primary Examiner* — Wojciech Haske
(74) *Attorney, Agent, or Firm* — McCarter & English, LLP

(57) ABSTRACT

The present disclosure relates to an electroplated bead wire having excellent oxidation resistance, of which oxidation resistance and aging adhesive strength with tire rubber are improved by forming a copper- and cobalt-plated layer by electroplating. The electroplated bead wire includes the plated layer formed through electroplating, wherein the plated layer contains 40 to 99 wt % of copper and 1 to 40 wt % of cobalt.

6 Claims, 11 Drawing Sheets

(51) Int. Cl.
 *C25D 3/12* (2006.01)
 *C25D 3/38* (2006.01)
 *C25D 7/06* (2006.01)
 *C25D 5/10* (2006.01)
(52) U.S. Cl.
 CPC ............ *C25D 5/10* (2013.01); *C25D 5/605* (2020.08); *C25D 7/0607* (2013.01)

(56) References Cited

FOREIGN PATENT DOCUMENTS

| | | |
|---|---|---|
| JP | H 07-8917 B2 | 2/1995 |
| JP | 2009-215673 A | 9/2009 |
| JP | 2011-219837 A | 11/2011 |
| JP | 2013-053359 A | 3/2013 |
| JP | 5333331 B2 | 11/2013 |
| JP | 2014-519435 A | 8/2014 |
| JP | 2015-511998 A | 4/2015 |
| JP | 2016-044370 A | 4/2016 |
| JP | 2018-119190 A | 8/2018 |
| KR | 1982-0001983 B1 | 10/1982 |
| KR | 10-0291467 B1 | 5/2001 |
| KR | 10-2002-0055203 A | 7/2002 |
| KR | 10-2002-0078168 A | 10/2002 |
| KR | 10-1670266 B1 | 10/2016 |
| KR | 10-1877890 B1 | 7/2018 |
| WO | WO 2013/097082 A1 | 7/2013 |

\* cited by examiner

FIG. 10

| EXAMPLE | PLATING METHOD | Cu (%) | Sn (%) | Co (%) | P (%) | INITIAL STAGE | | | 3 MONTHS AGING | | | | 6 MONTHS AGING | | | |
|---|---|---|---|---|---|---|---|---|---|---|---|---|---|---|---|---|
| | | | | | | ADHESIVE STRENGTH (KGF/2") | ADHESION APPEARANCE (%) | LINE SURFACE OXYGEN PERCENT (%) | ADHESIVE STRENGTH (KGF/2") | ELAPSED-TIME RATE (%) | ADHESION APPEARANCE (%) | LINE SURFACE OXYGEN PERCENT (%) | ADHESIVE STRENGTH (KGF/2") | ELAPSED-TIME RATE (%) | ADHESION APPEARANCE (%) | LINE SURFACE OXYGEN PERCENT (%) |
| COMPARATIVE EXAMPLE | CHEMICAL PLATING | 98 | 2 | - | - | 155 | 70 | 10 | 112 | -28% | 30 | 30 | 98 | -37% | 35 | 40 |
| EXAMPLE 1 | ELECTROPLATING | 68 | - | 3 | - | 156 | 85 | 9 | 145 | -7% | 82 | 10 | 140 | -10% | 80 | 13 |
| EXAMPLE 2 | | 48 | - | 3 | - | 158 | 85 | 8 | 148 | -6% | 84 | 10 | 143 | -9% | 81 | 12 |
| EXAMPLE 3 | | 68 | - | 5 | - | 156 | 85 | 8 | 148 | -5% | 83 | 10 | 143 | -8% | 81 | 11 |
| EXAMPLE 4 | | 48 | - | 5 | - | 159 | 90 | 5 | 150 | -6% | 84 | 10 | 145 | -9% | 82 | 12 |
| EXAMPLE 5 | | 68 | - | 10 | - | 160 | 90 | 5 | 156 | -3% | 87 | 9 | 153 | -4% | 85 | 10 |
| EXAMPLE 6 | | 48 | - | 10 | - | 161 | 90 | 4 | 157 | -2% | 88 | 8 | 155 | -4% | 86 | 9 |
| EXAMPLE 7 | | 68 | - | 30 | - | 163 | 90 | 3 | 159 | -2% | 88 | 6 | 155 | -5% | 85 | 8 |
| EXAMPLE 8 | | 48 | - | 30 | - | 162 | 90 | 4 | 157 | -3% | 88 | 7 | 154 | -5% | 86 | 8 |
| EXAMPLE 9 | | 68 | - | 40 | - | 159 | 85 | 5 | 151 | -5% | 83 | 7 | 148 | -7% | 80 | 9 |
| EXAMPLE 10 | | 48 | - | 40 | - | 158 | 85 | 5 | 149 | -6% | 82 | 8 | 145 | -8% | 81 | 10 |
| EXAMPLE 11 | | 68 | - | 40 | 10 | 156 | 85 | 5 | 150 | -4% | 82 | 7 | 146 | -6% | 80 | 9 |
| EXAMPLE 12 | | 48 | - | 40 | 10 | 157 | 85 | 5 | 149 | -5% | 82 | 8 | 147 | -6% | 80 | 10 | ced bead wire having excellent oxidation resistance, and more particularly, to an electroplated bead wire having excellent oxidation resistance, of which oxidation resistance and aging adhesive strength with tire rubber are improved by forming a copper- and cobalt-plated layer by electroplating.

ELECTROPLATED BEAD WIRE HAVING EXCELLENT OXIDATION RESISTANCE

CROSS-REFERENCE TO RELATED APPLICATIONS

This application is the National Stage entry under 35 U.S.C. § 371 of International Application Number PCT/KR2019/002258 filed on Feb. 25, 2019, published on Sep. 19, 2019 under publication number WO 2019/177281 A1, which claims the benefit of priority under 35 U.S.C. § 119 of Korean patent application number 10-2018-0028848 filed Mar. 12, 2018.

TECHNICAL FIELD

The present disclosure relates to an electroplated bead wire having excellent oxidation resistance, and more particularly, to an electroplated bead wire having excellent oxidation resistance, of which oxidation resistance and aging adhesive strength with tire rubber are improved by forming a copper- and cobalt-plated layer by electroplating.

BACKGROUND ART

In general, bead wires embedded in a bead portion of automobile tires are prepared by plating surfaces of wires plated with an alloy of copper and tin mainly by using a chemical plating or substitution plating method to improve the adhesive strength with rubber. The adhesive strength between a bronze-plated bead wire and rubber is known to depend on a bond between a copper component in the bronze and sulfur in the rubber, but the adhesive strength between rubber and the bead wire gradually increases due to a chemical reaction between the bronze and rubber upon contact of the two materials while curing (vulcanization) of the bronze-plated bead wire.

In order to obtain high adhesive strength between the bead wire and rubber, an adhesion reaction rate during the curing period needs to be properly controlled, and in order to control the adhesion reaction rate, the bead wire is plated with bronze containing an appropriate ratio of tin and copper.

However, when the bead wire is prepared by such chemical plating or substitution plating, the following problems may occur.

The adhesive strength between the bead wire plated with bronze by chemical plating or substitution plating and tire rubber gradually decreases due to various factors over time, compared to that of an initial stage of the vulcanization. The main factors of the decrease in adhesive strength include repeated compression and tensile loads applied on tires when the tires are being driven and extreme heat and moisture conditions exerted on the tires from the outside, and the decrease in adhesive strength between the bead wire and rubber may occur due to moisture or oxygen.

Also, after manufacture, a bead wire needs to be transported to a tire manufacturing site for tire production. In the bead wire transporting process, as shown in FIG. 1, a relative humidity condition of 80 RH % or more is derived, and when the bead wire is exposed to such an environment for 10 days or more, condensation occurs (that is, when cooled down below the dew point, absolute humidity is greater than a saturation water vapor amount), in which vaporized moisture near the product liquefies due to the temperature difference, and thus the process has problems of oxidation of a surface of the bead wire or deterioration of the adhesive strength.

In addition, referring to FIG. 2A, when a plated layer 20 that is bronze-plated by using a conventional chemical plating or substitution plating method, the plated layer 20 is not formed deep in the surface of a wire 10, and the plated layer 20 may have a a bare surface. More particularly, referring to FIG. 2B, when the bronze-plated layer 20 is formed on the surface of the wire 10 by using a chemical plating or substitution plating method, the plated layer 20 is not uniformly formed, and thus the thickness of the plated layer 20 may be partially different. Also, deep in the surface of the wire 10, there may be a bare surface on which a plated layer is not formed at all.

When a non-plated iron base metal (wire) remains, a smooth adhesive interface is not formed during vulcanization with rubber, and thus the surface not plated due to external environments such as moisture or oxygen easily corrodes, and the rubber adhesive strength is poor, which may result in a deterioration of adhesion between the bead wire and rubber (as well as deterioration of aging adhesive strength).

In the case of a bead wire plated with bronze, to solve the problems described above, an organic solvent coating with a solvent such as xylene is performed after the plating process, but the environment is polluted by the use of xylene, which is an environmentally harmful substance. In order to prevent the problem of environmental pollution, environmental protection facilities such as a discharge facility may be used, but this has the problem of increased manufacturing costs.

DESCRIPTION OF EMBODIMENTS

Technical Problem

The present disclosure is provided to solve the above-mentioned problems, and more particularly, to provide an electroplated bead wire having excellent oxidation resistance, of which the oxidation resistance and the aging adhesive strength with tire rubber are enhanced by formation of a copper- and cobalt-plated layer by using an electroplating method.

Solution to Problem

According to an aspect of the present disclosure to solve the above-mentioned problems, an electroplated bead wire having excellent oxidation resistance includes a plated layer formed by electroplating, wherein the plated layer includes 40 to 99 weight % (wt %) of copper and 1 to 40 wt % of cobalt.

The plated layer of the electroplated bead wire having excellent oxidation resistance according to an aspect of the present disclosure to solve the above-mentioned problems may further include a third element, wherein the third element is preferably 1 to 20 wt % of phosphorus.

The plated layer of the electroplated bead wire having excellent oxidation resistance according to an aspect of the present disclosure to solve the above-mentioned problems may further include a third element, wherein the third element is any one element selected from nickel, indium, bismuth, zinc, tin, manganese, and molybdenum, and an amount of the third element is preferably 1 to 20 wt %.

A thickness of the plated layer of the electroplated bead wire having excellent oxidation resistance according to an aspect of the present disclosure to solve the above-mentioned problems may be preferably in a range of 0.005 to 2.0 μm, wherein copper of the plated layer is preferably formed by electroplating in a first electroplating bath, and cobalt of the plated layer is preferably formed by electroplating in a second electroplating bath after going through the first electroplating bath.

A plating solution used in the first electroplating bath and the second electroplating bath of the electroplated bead wire having excellent oxidation resistance according to an aspect of the present disclosure to solve the above-mentioned problems may preferably include at least one selected from cyanide, pyrophosphoric acid, chloride, sulfide, and hypophosphoric acid plating solutions, wherein the plating solution of the first electroplating bath is used as a metal salt of the copper, wherein a concentration of the metal salt of the copper is preferably 20 to 150 g/L, and the plating solution of the second electroplating bath is used as a metal salt of the cobalt, wherein a concentration of the metal salt of the cobalt is preferably 1 to 20 g/L.

An electroplating temperature of the first electroplating bath and the second electroplating bath of the electroplated bead wire having excellent oxidation resistance according to an aspect of the present disclosure is preferably 20 to 60° C.° C. to solve the above-mentioned problems.

Advantageous Effects of Disclosure

The present disclosure relates to a bead wire, of which a copper- and cobalt-plated layer is formed using an electroplating method, wherein the present disclosure has advantages of forming a dense plated layer without a non-plated (bare) surface by forming the copper- and cobalt-plated layer by using an electroplating method and improving the oxidation resistance and aging adhesive strength with tire rubber by forming the plated layer.

Also, the present disclosure has advantages of improving the oxidation resistance and aging adhesive strength by forming the plated layer with cobalt by using an electroplating method and decreasing the manufacturing cost by reducing an amount of the plated layer of the bead wire at the same time.

Also, the present disclosure has advantages of not needing an organic solvent coating process by forming a plated layer with cobalt by using an electroplating method, thereby preventing environmental pollution and reducing the manufacturing cost of the bead wire.

BRIEF DESCRIPTION OF DRAWINGS

FIG. 10 is an experimental result table in which an electroplated bead wire having excellent oxidation resistance according to an embodiment of the present disclosure is compared with a conventional bead wire.

MODE OF DISCLOSURE

The present disclosure relates to an electroplated bead wire having excellent oxidation resistance, of which the oxidation resistance and the aging adhesive strength with tire rubber are enhanced by formation of a copper- and cobalt-plated layer by using an electroplating method. Hereinafter, exemplary embodiments of the present disclosure will be described in detail with reference to the accompanying drawings.

The electroplated bead wire having excellent oxidation resistance according to an embodiment of the present disclosure is formed by including a plated layer 120 formed by electroplating.

Figure 3:
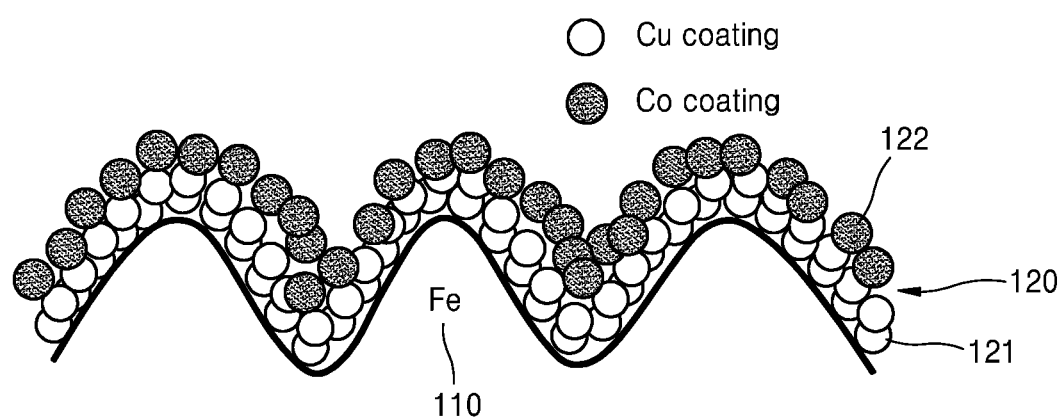
FIG. 3 is a schematic view of the arrangement of elements of a plated layer according to an embodiment of the present disclosure.

The plated layer 120 is formed by electroplating a wire 110 (or a steel wire), and the plated layer 120 is formed on the wire 110. Referring to FIG. 3, the plated layer 120 is formed by electroplating, and may consist of 40 weight % (wt %) to 99 wt % of copper 121 and 1 wt % to 40 wt % of cobalt 122.

Here, preferably, the copper 121 may consist of 40 wt % to 80 wt %, and the cobalt 122 may consist of 1 wt % to 40 wt %. In this regard, when the plated layer 120 is formed with the copper 121 and the cobalt 122 by electroplating, oxidation resistance and aging adhesive strength of the plated layer may improve compared to those of the conventional bronze (copper and tin)-plated layer.

Also, when the plated layer 120 is formed by electroplating with the cobalt 122, the plated layer 120 has an advantage of reducing an amount of copper to about 10 to 70 wt % of the conventional copper used in chemical plating or substitution plating, and there is an advantage of reducing an amount of the plated layer 120 in this regard. (Also, since an atomic weight of cobalt is smaller than that of copper or tin, when cobalt is used instead of tin, an amount of the plated layer 120 may be decreased.)

The plated layer 120 according to an embodiment of the present disclosure is preferably a binary plated layer formed of the copper 121 and the cobalt 122, but embodiments are not limited thereto. For example, the plated layer 120 may consist of a tertiary plated layer by using a third element together with the copper 121 and the cobalt 122.

In particular, the plated layer 120 may further consist of a third element, and the third element may consist of 1 wt % to 20 wt % of phosphorus. Also, the third element may be any one element selected from nickel, indium, bismuth, zinc, tin, manganese, and molybdenum, and an amount of the third element may be 1 to 20 wt %.

In this manner, when the phosphorus component, which is a non-metal material, is alloy-treated in the plated layer 120 or when nickel, indium, bismuth, zinc, tin, manganese, or molybdenum, which is a metal component, is alloy-treated in the plated layer 120, an amorphous plated layer having an affinity between heteroatoms stronger than an affinity between homogeneous atoms may be formed. When the plated layer 120 is used, oxidation resistance and aging adhesive strength may significantly improve.

In particular, when the phosphorus component, which is a non-metal material, is alloy-treated a plated layer by using an electroplating method or when nickel, indium, bismuth, zinc, tin, manganese, or molybdenum, which is a metal component, is alloy-treated in the plated layer by using an electroplating method, an amorphous plated layer having an affinity between heteroatoms stronger than an affinity between homogeneous atoms may be formed. This allows formation of a further dense structure to the plated layer 120, and thus a surface not plated on a steel wire (a bare surface) having a complicated irregularities shape may be reduced.

As described above, the plated layer 120 may be formed of a binary plated layer of the copper 121 and the cobalt 122 or may be formed of a tertiary plated layer of the copper 121, the cobalt 122, and the third element. However, embodiments are not limited thereto, and, according to the need, the plated layer 120 may be formed by simultaneously using a plurality of the third elements.

A thickness of the plated layer 120 may be in a range of 0.005 to 2.0 μm. The conventional chemical plating or substitution plating method needs to use a complexing agent and a reducing agent in order to plate at least two different components on copper-tin, but a plating speed of the method is significantly slow, and thus the method has had a problem of being difficult to apply in the industrial sites. However, an embodiment of the present disclosure includes plating by electroplating, which allows at least two components to be plated at an appropriate plating speed, and thus a thickness of the plated layer 120 on which the at least two components are plated may be in a range of 0.005 to 2.0 μm. (Here, preferably, a thickness of the plated layer 120 may be in a range of 0.1 to 2.0 μm or 0.01 to 2.0 μm.)

Figure 1:
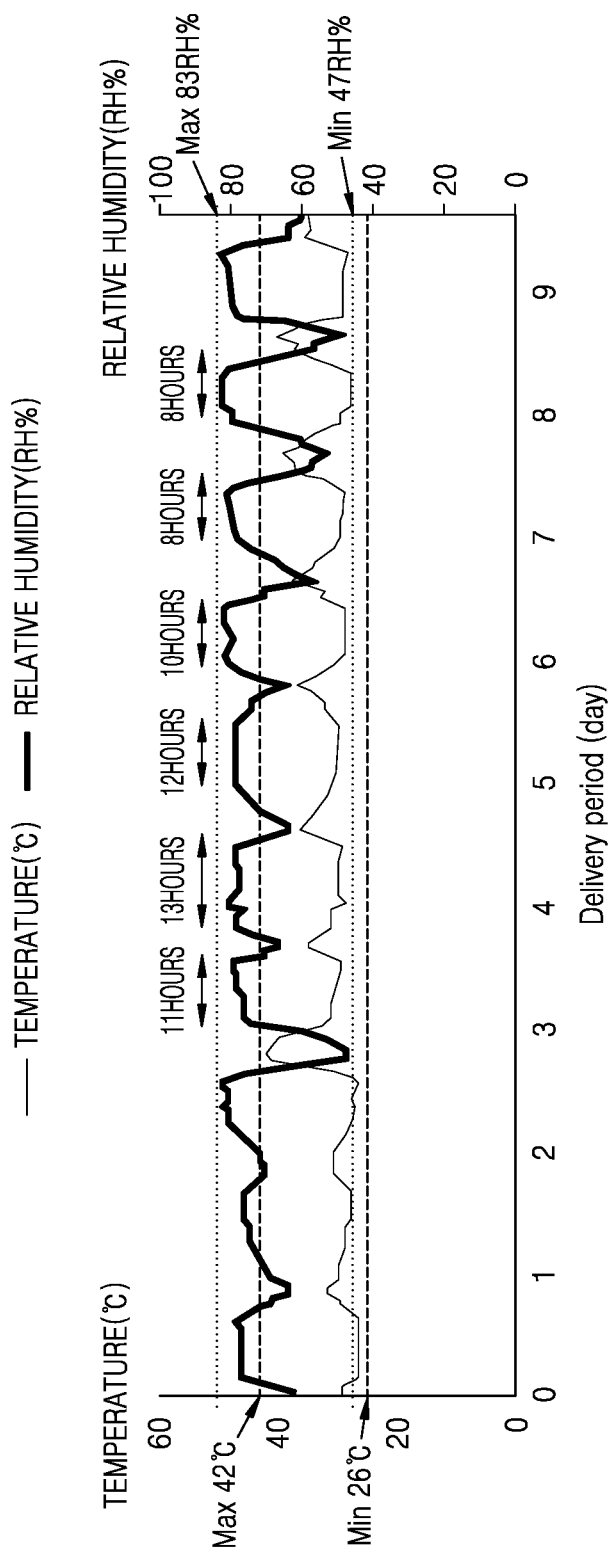
FIG. 1 is a view that shows temperature and humidity conditions of a bead wire transporting process.
Figure 2A:
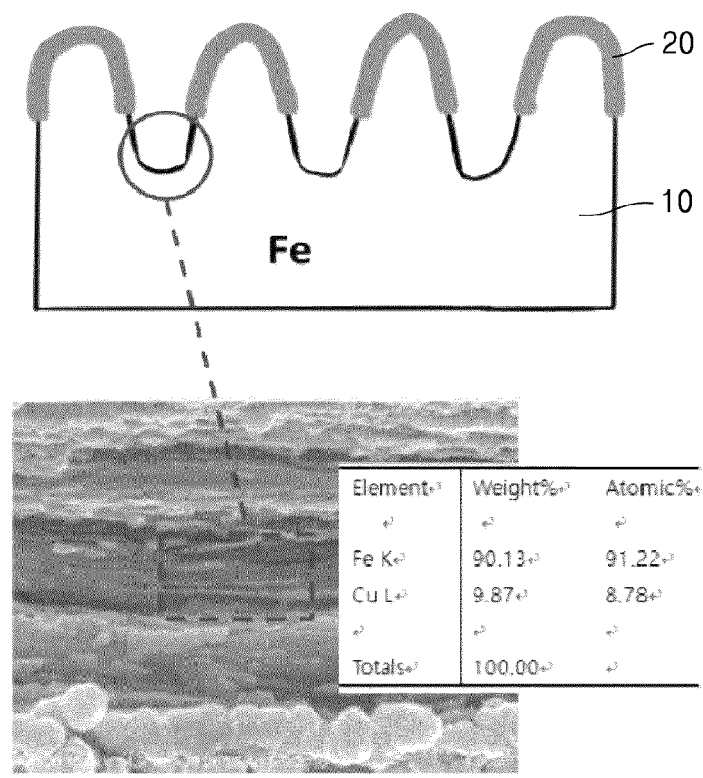
FIGS. 2A and 2B are views that show a surface of a plated layer according to conventional chemical plating or substitution plating.
Figure 4:
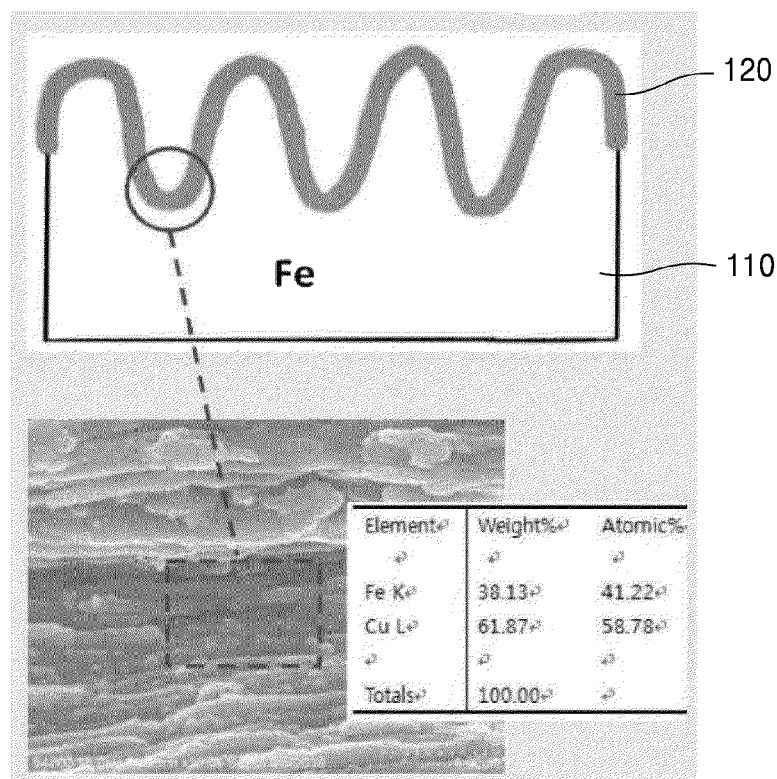
FIG. 4 is a view that shows a surface of a copper- and cobalt-plated layer formed by electroplating, according to an embodiment of the present disclosure.

The plated layer 120 according to an embodiment of the present disclosure is formed by electroplating, and, referring to FIG. 4, when a plated layer is formed by using an electroplating method, a dense plated layer may be formed compared to that formed by using a conventional chemical plating or substitution plating method. In general, steel wires have complex irregularities on the surface, but in the case of conventional chemical plating or substitution plating, the surface is not plated by the complicated irregularities (bare surface)(see FIGS. 2A and 2B). However, the present disclosure may minimize non-plated surface (bare surface) by forming an amorphous plated layer by using an electroplating method, and thus oxidation resistance and aging adhesive strength of the bead wire 120 may increase. (FIGS. 2A and 4 are the results obtained by observing a surface of the plated layer of the bead wire by using field emission scanning electron microscope (FE-SEM) to see whether the plated layer is uniformly formed up to inside of wire irregularities and then by performing an energy dispersive X-ray (EDX) qualitative analysis.)

A process of forming the plated layer 120 by electroplating is as follows.

Figure 5:
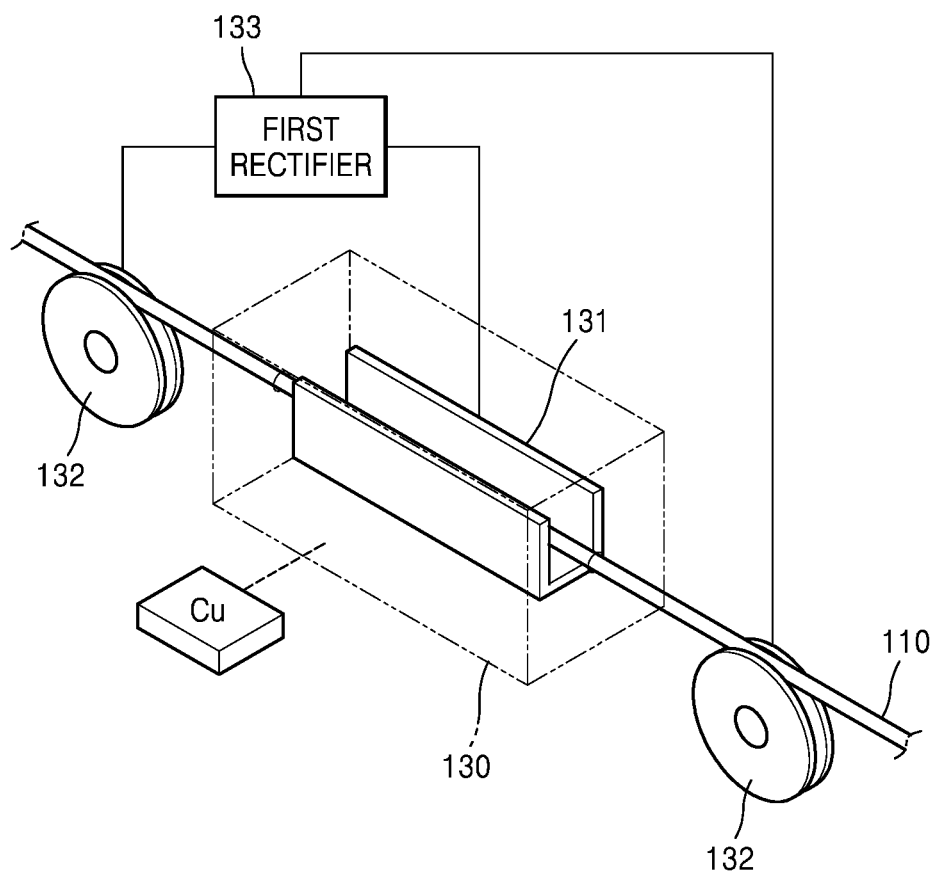
FIG. 5 is a view that illustrates first electroplating in which a layer is electroplated with copper in a first electroplating bath, according to an embodiment of the present disclosure.
Figure 6:
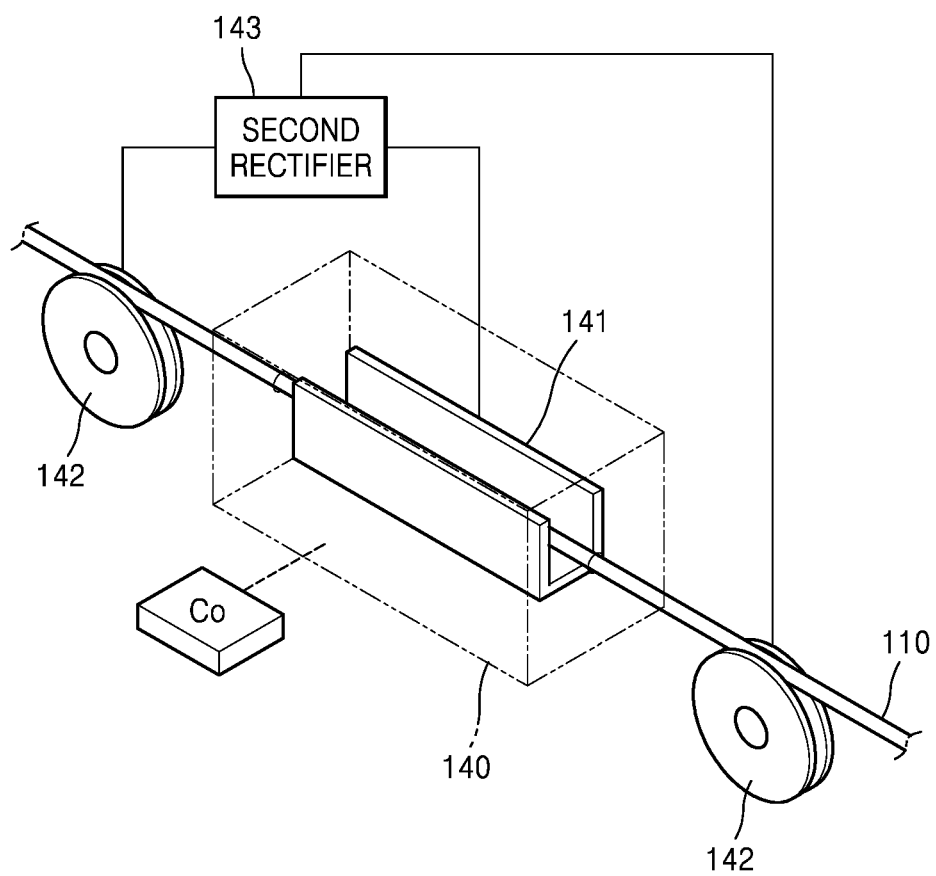
FIG. 6 is a view that illustrates second electroplating in which the layer is electroplated with cobalt in a second electroplating bath, according to an embodiment of the present disclosure.

The wire 110 is electroplated while passing through an electroplating bath. Referring to FIG. 5, the copper 121 of the plated layer 120 may be formed by electroplating in a first electroplating bath 130, and, referring to FIG. 6, the cobalt 122 of the plated layer 120 may be formed by electroplating in a second electroplating bath 140 after the first electroplating bath 130. That is, the copper and the cobalt 122 of the plated layer 120 may each be formed by using an electroplating method.

First, the wire is electroplated while passing through the first electroplating bath 130. A cathode is applied to the wire 110 through first cathode rollers 132 each respectively equipped at an inlet and an outlet of the first electroplating bath 130, and an anode is applied to a first anode plate 131 immersed in the first electroplating bath 130, thereby forming a circuit. When a current is supplied while filling the first electroplating bath 130 with a plating solution, plating proceeds.

Here, the plating solution used in the first electroplating bath 130 may be formed of including at least one selected from cyanide, pyrophosphoric acid, chloride, sulfide, and hypophosphoric acid plating solutions, and the plating solution formed of cyanide, pyrophosphoric acid, chloride, sulfide, or hypophosphoric acid may be used as a metal salt of copper. That is, the plating solution formed of including at least one selected from cyanide, pyrophosphoric acid, chloride, sulfide, and hypophosphoric acid is formed of a compound including copper. In this regard, when the electroplating is performed in the first electroplating bath 130 by using the compound including copper, a plated layer including the copper 121 may be formed.

Here, a concentration of the metal salt of the copper 121 may be, preferably, 20 to 150 g/L. When a concentration of the metal salt of the copper 121 is too low (lower than 20 g/L), a plating speed precipitating on the wire 110 is faster than a buffering speed, and thus burning may occur. Also, when a concentration of the metal salt of the copper 121 is too high (higher than 150 g/L), a metal salt is precipitated in the plating solution, and thus the plating solution may be unstable. In this regard, a concentration of the metal salt of the copper 121 may be, preferably, in a range of 20 g/L to lower than 150 g/L. However, it is obvious that a concentration of the plating solution is not limited thereto, and may be modified as necessary.

Also, the conventional chemical plating or substitution plating method needs to go through a diffusion heat treatment process of 500° C.° C. or higher, but the diffusion heat treatment of such a high temperature has a problem of strength decrease of the bead wire. However, an electroplating method may be performed at a temperature in a range of 20° C.° C. to 60° C.° C. without a diffusion heat treatment process of a high temperature, and thus the electroplating method has an advantage of preventing strength decrease of the bead wire. In this regard, an electroplating temperature of the first electroplating bath 130 is preferable in a range of 20° C. to 60° C. (When an electroplating temperature is 60° C. or higher, sludge may be precipitated in the plating solution, and thus the plated layer may become unstable. In this regard, an electroplating temperature of the first electroplating bath 130 is preferable in a range of 20° C. to 60° C.)

The wire 110 electroplated in the first electroplating bath 130 is electroplated while passing through the second electroplating bath 140, thereby enabling electroplating of cobalt on the plated layer 120. The electroplating in the second electroplating bath 140 may be performed in the same manner as the process of the first electroplating bath 130, and the metal salt of cobalt is used instead of the metal salt of copper.

In particular, a cathode is applied to the wire 110 through second cathode rollers 142 each respectively equipped at an inlet and an outlet of the second electroplating bath 140, and an anode is applied to a second anode plate 141 immersed in the second electroplating bath 140, thereby forming a circuit. When a current is supplied while filling the second electroplating bath 140 with a plating solution, plating proceeds.

Here, the plating solution used in the second electroplating bath 140 may be formed of including at least one selected from cyanide, pyrophosphoric acid, chloride, sulfide, and hypophosphoric acid plating solutions, and the plating solution formed of cyanide, pyrophosphoric acid, chloride, sulfide, or hypophosphoric acid may be used as a metal salt of cobalt. That is, the plating solution formed of including at least one selected from cyanide, pyrophosphoric acid, chloride, sulfide, and hypophosphoric acid is formed of a compound including cobalt. In this regard, when the electroplating is performed in the second electroplating bath 140 by using the compound including cobalt, a plated layer including the cobalt 122 may be formed.

Here, a concentration of the metal salt of the cobalt 122 may be, preferably, 1 to 20 g/L. When a concentration of the metal salt of the cobalt 122 is too low (lower than 1 g/L), a plating speed precipitating on the wire 110 is faster than a buffering speed, and thus burning may occur. Also, when a concentration of the metal salt of the cobalt 122 is too high (higher than 20 g/L), a metal salt is precipitated in the plating solution, and thus the plating solution may be unstable. In this regard, a concentration of the metal salt of the cobalt 122 may be, preferably, in a range of 1 g/L to lower than 20 g/L. However, it is obvious that a concentration of the plating solution is not limited thereto, and may be modified as necessary.

An electroplating temperature of the second electroplating bath 140 is preferably in a range of 20° C. to 60° C., and thus the electroplating method has an advantage of preventing strength decrease of the bead wire that occurs during a heat treating process at a high temperature. (When an electroplating temperature is 60° C. or higher, sludge may be precipitated in the plating solution, and thus the plated layer may become unstable. In this regard, an electroplating temperature of the second electroplating bath 140 is, preferable, in a range of 20° C. to 60° C.)

A first rectifier 133 and a second rectifier 142 may be used in the first electroplating bath 130 and the second electroplating bath 140, and since the first and second rectifiers 133 and 143 are rectifiers commonly used in the art, detail description thereof will be omitted.

When a current is supplied to perform electroplating in the first electroplating bath 130 and the second electroplating bath 140, a current density is, preferably, 1 to 50 A/dm$^2$, and an electroplating time is, preferably, 10 seconds or less (not including 0 second). Also, the current supplied to the first electroplating bath 130 and the second electroplating bath 140 is, preferably, a direct or pulse current.

Figure 8:
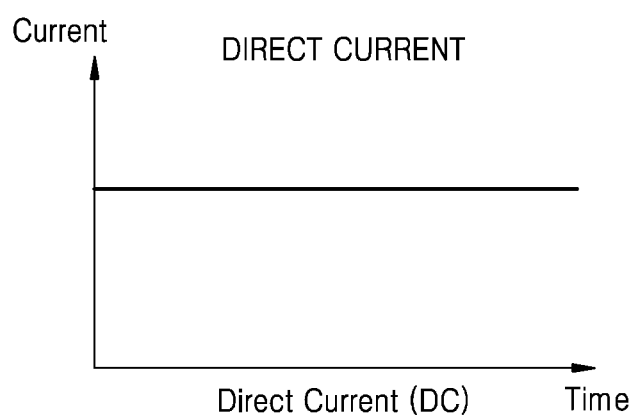
FIG. 8 is a view that shows direct-current electroplating in electroplating, according to an embodiment of the present disclosure.
Figure 9:
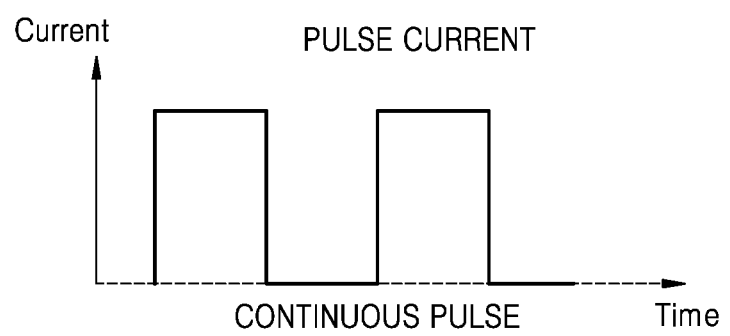
FIG. 9 is a view that shows pulse electroplating in electroplating, according to an embodiment of the present disclosure.

In particular, the method of applying a cathode to the wire 111 may use a direct current having a high productivity as shown in FIG. 8, and, in the case of a wire having very rough surface, as shown in FIG. 9, a pulse method that periodically applies a cathode is preferably used to form a plated layer with uniform irregularities.

A thickness of the plated layer 120 formed by electroplating is in a range of 0.005 to 2.0 μm, where a density of the supplied current is in a range of 1 to 50 A/dm$^2$, and a time of the current is 10 seconds to maintain the thickness (not including 0 second). However, the density of the current is not limited thereto, and the current density may be 50 A/dm$^2$ or higher, and the time may be appropriately controlled to achieve a common adhesion amount of the bead wire.

A method of preparing an electroplated bead wire having excellent oxidation resistance according to an embodiment of the present disclosure is described in detail as follows.

Figure 7:
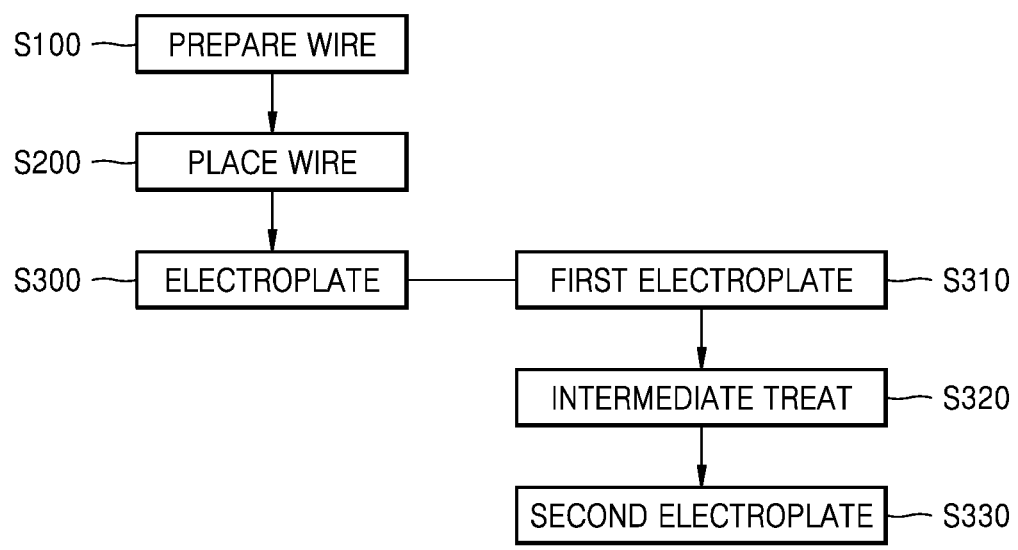
FIG. 7 is a flowchart that illustrates a method of preparing an electroplated bead wire having excellent oxidation resistance according to an embodiment of the present disclosure.

Referring to FIG. 7, the method of preparing electroplated bead wire having excellent oxidation resistance includes preparing a wire (S100), disposing the wire (S200), and electroplating the wire (S300).

The preparing of the wire (S100) is an operation of processing a wire 110 before electroplating. The wire 110 may be wire-drawn and heat-treated before electroplating. Also, the wire 110 may be acid-washed by using a hydrochloric acid solution. The preparing of the wire (S100) us an operation of preparing the wire 110 before electroplating, which may include the wire-drawing process, heat-treating process, and acid-washing process, but the preparing of the wire 110 is not limited thereto, and it is obvious that other processes may be included in the method if there is a necessary process before the electroplating.

The disposing of the wire (S200) is an operation of disposing the wire 110 to electroplating the wire 110. The wire 110 is electroplated while passing through an electroplating bath, and the disposing of the wire (S200) is an operation of disposing the wire 110 such that the wire 110 may pass the electroplating bath.

The electroplating of the wire (S300) is an operation of electroplating the wire 110 by supplying a current to the electroplating bath and passing the wire 110 through the electroplating bath. By using the electroplating method, the plated layer 120 including 40 to 99 wt % of the copper 121 and 1 to 40 wt % of the cobalt 122 may be formed.

Here, preferably, an amount of the copper 121 may be 40 to 80 wt %, and an amount of the cobalt 122 may be 1 to 40 wt %. When the plated layer 120 is formed by using the copper 121 and the cobalt 122 by electroplating, oxidation resistance and aging adhesive strength of the plated layer may improve compared to those of the conventional bronze (copper and tin)-plated layer.

The plated layer 120 may be, preferably, used as a binary plated layer formed of the copper 121 and the cobalt 122, but embodiments are not limited thereto. For example, when the plated layer 120 may be formed of a tertiary plated layer by using a third element together with the copper 121 and the cobalt 122. (Here, the third element may also be formed by electroplating.)

In particular, the plated layer 120 may be formed further including a third element, and the third element may include 1 to 20 wt % of phosphorus. Also, the third element may be any one element selected from nickel, indium, bismuth, zinc, tin, manganese, and molybdenum, and an amount of the third element may be 1 to 20 wt %.

A thickness of the plated layer 120 may be in a range of 0.005 to 2.0 μm. The conventional chemical plating or substitution plating method needs to use a complexing agent and a reducing agent in order to plate at least two different components on copper-tin, but a plating speed of the method is significantly slow, and thus the method has had a problem of being difficult to apply in the industrial sites. However, an embodiment of the present disclosure includes plating by electroplating, which allows at least two components to be plated at an appropriate plating speed, and thus a thickness of the plated layer 120 on which the at least two components are plated may be in a range of 0.005 to 2.0 μm. (Here, preferably, a thickness of the plated layer 120 may be in a range of 0.1 to 2.0 μm or 0.01 to 2.0 μm.)

Referring to FIG. 7, the electroplating of the wire (S300) may include a first electroplating (S310) and a second electroplating (S330). The first electroplating (S310) is an operation of electroplating the wire 110 by using a metal salt including copper in the first electroplating bath 130, and the second electroplating S330 is an operation of electroplating the wire 110 underwent the first electroplating S310 by using a metal salt including cobalt in the second electroplating bath 140. That is, the copper 121 of the plated layer 120 is formed by electroplating in the first electroplating bath 130, and the cobalt 122 of the plated layer 120 is formed by electroplating in the second electroplating bath 140.

In particular, the first electroplating (S310) includes electroplating the wire 110 while passing through the first electroplating bath 130. A cathode is applied to the wire 110 through first cathode rollers 132 each respectively equipped at an inlet and an outlet of the first electroplating bath 130, and an anode is applied to a first anode plate 131 immersed in the first electroplating bath 130, thereby forming a circuit. When a current is supplied while filling the first electroplating bath 130 with a plating solution, plating proceeds.

Here, the plating solution used in the first electroplating bath 130 may be formed of including at least one selected from cyanide, pyrophosphoric acid, chloride, sulfide, and hypophosphoric acid plating solutions, and the plating solution formed of cyanide, pyrophosphoric acid, chloride, sulfide, or hypophosphoric acid may be used as a metal salt of copper. That is, the plating solution formed of including at least one selected from cyanide, pyrophosphoric acid, chloride, sulfide, and hypophosphoric acid is formed of a compound including copper. In this regard, when the electroplating is performed in the first electroplating bath 130 by using the compound including copper, a plated layer including the copper 121 may be formed.

Here, a concentration of the metal salt of the copper 121 may be, preferably, 20 to 150 g/L. When a concentration of the metal salt of the copper 121 is too low (lower than 20 g/L), a plating speed precipitating on the wire 110 is faster than a buffering speed, and thus burning may occur. Also, when a concentration of the metal salt of the copper 121 is too high (higher than 150 g/L), a metal salt is precipitated in the plating solution, and thus the plating solution may be unstable. In this regard, a concentration of the metal salt of the copper 121 may be, preferably, in a range of 20 g/L to lower than 150 g/L. However, it is obvious that a concentration of the plating solution is not limited thereto, and may be modified as necessary.

Also, the conventional chemical plating or substitution plating method needs to go through a diffusion heat treatment process of 500° C. or higher, but the diffusion heat treatment of such a high temperature has a problem of strength decrease of the bead wire. However, an electroplating method may be performed at a temperature in a range of 20° C. to 60° C. without a diffusion heat treatment process of a high temperature, and thus the electroplating method has an advantage of preventing strength decrease of the bead wire. In this regard, an electroplating temperature of the first electroplating (S310) is preferable in a range of 20° C. to 60° C. (When an electroplating temperature is 60° C. or higher, sludge may be precipitated in the plating solution, and thus the plated layer may become unstable. In this regard, an electroplating temperature of the first electroplating bath 130 is preferable in a range of 20° C. to 60° C.)

In the second electroplating (S330), the wire 110 electroplated in the first electroplating bath 130 is electroplated while passing through the second electroplating bath 140, thereby enabling electroplating of cobalt on the plated layer 120. The electroplating in the second electroplating bath 140 may be performed in the same manner as the process of the first electroplating bath 130, and the metal salt of cobalt is used instead of the metal salt of copper.

A cathode is applied to the wire 110 through second cathode rollers 142 each respectively equipped at an inlet and an outlet of the second electroplating bath 140, and an anode is applied to a second anode plate 141 immersed in the second electroplating bath 140, thereby forming a circuit. When a current is supplied while filling the second electroplating bath 140 with a plating solution, plating proceeds.

Here, the plating solution used in the second electroplating bath 140 may be formed of including at least one selected from cyanide, pyrophosphoric acid, chloride, sulfide, and hypophosphoric acid plating solutions, and the plating solution formed of cyanide, pyrophosphoric acid, chloride, sulfide, or hypophosphoric acid may be used as a metal salt of cobalt. That is, the plating solution formed of including at least one selected from cyanide, pyrophosphoric acid, chloride, sulfide, and hypophosphoric acid is formed of a compound including cobalt. In this regard, when the electroplating is performed in the second electroplating bath 140 by using the compound including cobalt, a plated layer including the cobalt 122 may be formed.

Here, a concentration of the metal salt of the cobalt 122 may be, preferably, 1 to 20 g/L. When a concentration of the metal salt of the cobalt 122 is too low (lower than 1 g/L), a plating speed precipitating on the wire 110 is faster than a buffering speed, and thus burning may occur. Also, when a concentration of the metal salt of the cobalt 122 is too high (higher than 20 g/L), a metal salt is precipitated in the plating solution, and thus the plating solution may be unstable. In this regard, a concentration of the metal salt of the cobalt 122 may be, preferably, in a range of 1 g/L to lower than 20 g/L. However, it is obvious that a concentration of the plating solution is not limited thereto, and may be modified as necessary.

An electroplating temperature of the second electroplating (S330) is preferably in a range of 20° C. to 60° C., and thus the electroplating method has an advantage of preventing strength decrease of the bead wire that occurs during a heat treating process at a high temperature. (When an electroplating temperature is 60° C. or higher, sludge may be precipitated in the plating solution, and thus the plated layer may become unstable. In this regard, an electroplating temperature of the second electroplating bath 140 is, preferable, in a range of 20° C. to 60° C.)

When a current is supplied to perform electroplating in the first electroplating S310 and the second electroplating S330, a current density is, preferably, 1 to 50 A/dm$^2$, and an electroplating time is, preferably, 10 seconds or less (not including 0 second). Also, the current supplied to the first electroplating S310 and the second electroplating S330 is, preferably, a direct or pulse current.

In particular, the method of applying a cathode to the wire 111 may use a direct current having a high productivity as shown in FIG. 8, and, in the case of wire having very rough surface, as shown in FIG. 9, a pulse current that periodically applies a cathode is preferable to form a uniformly plated layer of the irregularities.

A thickness of the plated layer 120 formed by electroplating is in a range of 0.005 to 2.0 μm, where a density of the supplied current is in a range of 1 to 50 A/dm$^2$, and a time of the current is 10 seconds to maintain the thickness (not including 0 second). However, the density of the current is not limited thereto, and the current density may be 50 A/dm$^2$ or higher, and the time may be appropriately controlled to achieve a common adhesion amount of the bead wire.

The electroplating (S300) may further include an intermediate treating (S320). The intermediate treating (S320) is an operation that may be performed after the first electroplating (S310) and before the second electroplating (S330) in which a surface of the wire 110 may be washed after the first electroplating (S310).

In particular, the intermediate treating (S320) is a rinsing tank or washing tank operation preparing the second electroplating (S330) which may be a pre-treating process to increase an electroplating effect of a cobalt metal salt in the second electroplating (S330). However, the intermediate treating (S320) is not limited thereto and may include various operations that may treat the wire 110 after the first electroplating (S310) and before the second electroplating (S330).

Hereinafter, examples of the electroplated bead wire having excellent oxidation resistance according to an embodiment of the present disclosure will be described.

EXAMPLE

A wire having a carbon amount of 0.80% and a diameter of 5.5 mm was acid-washed and wire-drawing processed so that a diameter was 1.30 mm, and the wire-drawing processed wire was heat-treated at a temperature in a range of 400 to 500° C. Subsequently, a line surface was washed by passing through a hydrochloric acid tank maintaining a temperature of 15±10% of a hydrochloric acid solution at 40±10° C.

A cathode was applied to the wire 110 through first cathode rollers 132 each respectively equipped at an inlet and an outlet of the first electroplating bath 130 while passing the washed wire 110 through the first electroplating bath 130, and an anode was applied to a first anode plate (Ti) 131 immersed in the first electroplating bath 130, thereby forming a circuit. Here, the plating solution was constituted by 100 g/L of copper pyrophosphate, 10 g/L of stannous chloride, 15 g/L of cobalt chloride, 100 g/L of sodium hypophosphite, and 300 g/L of potassium pyrophosphate, and a temperature of the plating solution was fixed at 45° C. Also, the current supplied to the wire 110 was a direct current having a current density of 10 A/dm$^2$ and a plating-treatment time of 2 seconds. (The first electroplating (S310))

Then, a cathode was applied to the wire 110 through second cathode rollers 142 each respectively equipped at an inlet and an outlet of the second electroplating bath 140 while passing the washed wire 110 through the second electroplating bath 140, and an anode was applied to a second anode plate (Ti) 141 immersed in a plating bath, thereby forming a circuit. Here, the plating solution was constituted by 100 g/L of copper pyrophosphate, 10 g/L of stannous chloride, 15 g/L of cobalt chloride, 100 g/L of sodium hypophosphite, and 300 g/L of potassium pyrophosphate, and a temperature of the plating solution was fixed at 45° C. Also, the current supplied to the wire 110 was a direct current having a current density of 5 A/dm$^2$ and a plating-treatment time of 7 seconds. (The second electroplating (S330))

Here, adjusting a current density to a range of 1 to 100 A/dm$^2$ and a plating time to 0.5 to 20 seconds was preferably in the experimental conditions. However, the current density and the plating time are not limited thereto, and it is obvious that the current density may be higher and the plating time may be shorter than these if the experimental conditions are improved.

FIG. 4 is a view illustrating that a copper- and cobalt-plated layer is formed up to inside of the wire through this analysis, and FIG. 10 shows the results of comparing oxidation resistances, initial adhesive strengths, and aging adhesive strengths of the conventional chemically plated bead wire and an electroplated bead wire according to an embodiment of the present disclosure through this analysis.

FIG. 10 shows initial adhesive strength, 3 months wet-aging adhesive strength, line surface oxygen percent after 3 month wet-aging, 6 months wet-aging adhesive strength, and surface oxygen percent after 6 months wet-aging per electroplating condition. Referring to the results shown in FIG. 10, it may be known that the wet-aging adhesive strength improved when a cobalt percent in the plated layer was 3 to 40%.

In particular, the initial adhesive strength of the bead wire according to an embodiment of the present disclosure increases, adhesive appearance becomes better, and a line surface oxygen percent decreases compare to those of the conventional chemical plated bead wire.

Also, it may be known that the bead wire according to an embodiment of the present disclosure had significantly increased aging adhesive strengths after 3 months and 6 months and significantly improved adhesion appearance compared to those of the conventional chemical plated bead wire. This is because the line surface oxygen percents after 3 months and 6 months were significantly smaller than the line surface oxygen percents of the conventional chemical plated bead wire. Particularly, the line surface oxygen percent of the conventional chemical plated bead wire increased as time elapsed, but a change of the line surface oxygen percent of the bead wire according to an embodiment of the present disclosure is small, and thus the aging adhesive strengths after 3 months and 6 months of the bead wire according to an embodiment of the present disclosure significantly increased.

The electroplated bead wire having excellent oxidation resistance according to an embodiment of the present disclosure has the following effects.

Figure 2B:
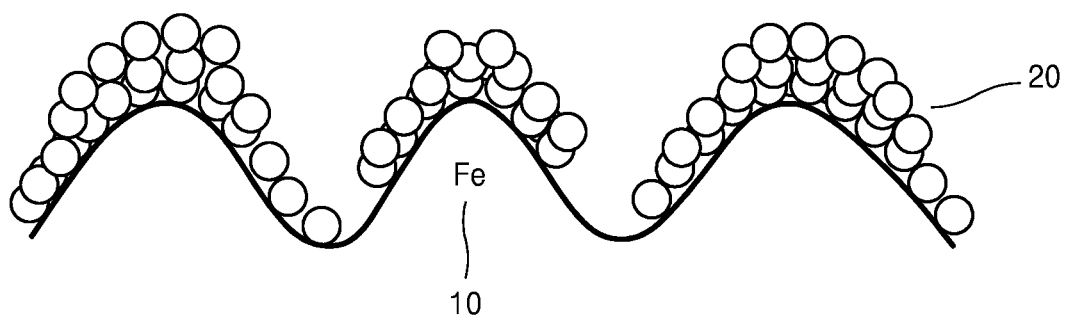

The bead wire according to an embodiment of the present disclosure may form a plated layer including copper and cobalt by electroplating. Referring to FIGS. 2B and 3, it may be known that the bead wire according to an embodiment of the present disclosure forms a plated layer that is denser than that formed by the conventional copper-tin bead wire, and thus the bead wire according to an embodiment of the present disclosure is advantageous in terms of enhancing the oxidation resistance and the aging adhesive strength with tire rubber.

Also, as shown in FIGS. 2A and 2B, the conventional chemical plating or substitution plating bead wire has bare surfaces not having a plated layer 20 formed up to deep in the surface of the wire, whereas, as shown in FIGS. 3 and 4, the bead wire according to an embodiment of the present disclosure forms a dense plated layer by using a copper- and cobalt-plated layer and thus is advantageous in terms of enhancing the oxidation resistance and the aging adhesive strength with tire rubber. (FIGS. 2A and 4 show the results of performing EDX qualitative analysis on a surface of the plated layer of the bead wire after observing whether the plated layer is uniformly formed up to inside of the wire irregularities by using FE-SEM.)

A plating speed of copper-tin of a conventional chemical plating or substitution plating method is slow, and thus the method has had the problem of being difficult to apply to industrial sites, but the bead wire according to an embodiment of the present disclosure may improve a plating speed by electroplating and has an advantage of forming a plated layer at an appropriate thickness by controlling a current density and time. In addition, the bead wire according to an embodiment of the present disclosure has an advantage of preventing strength decrease of the bead wire which may occur at diffusion heat-treatment of 500° C. or higher as the electroplating proceeds at a temperature in a range of 20° C. to 60° C.

Also, since the bead wire according to an embodiment of the present disclosure forms a plated layer by using electroplating and cobalt, an adhesion amount of copper may be 10 to 70 wt % reduced compared to that of the conventional plated layer formed by using chemical plating and tin, and thus the bead wire has an advantageous of reducing an amount of the plated layer.

Also, the conventional chemical plating or substitution plating needs organic solvent coating using xylene as a solvent after performing a plating process on a bare surface where the plated layer is not formed, and thus has a problem of increasing environmental pollution and the manufacturing cost. However, since the bead wire according to an embodiment of the present disclosure uses electroplating, an organic solvent coating process is not necessary, and thus has an advantage of preventing environmental pollution and decreasing the cost.

As described above, the bead wire according to an embodiment of the present disclosure forms a plated layer including copper and cobalt through electroplating to improve oxidation resistance and physical properties of the plated layer, and thus the bead wire has an advantage of preventing oxidation of the bead wire that occurs during a process of transporting the bead wire. Further, when the oxidation resistance and physical properties of the bead wire improve, the bead wire has an advantage of simplifying product package for the transportation of the bead wire.

While one or more embodiments of the present disclosure have been described with reference to the figures, it will be understood by those of ordinary skill in the art that various changes and other equivalent embodiments may be made therein. Therefore, the scope of the present disclosure should be defined by the accompanying claims.

The invention claimed is:

1. An electroplated bead wire having excellent oxidation resistance and used as an automotive tire reinforcement, the bead wire comprising:
a plated layer formed by electroplating,
wherein the plated layer comprises 40 weight % (wt %) to 99 wt % of copper and 1 to 40 wt % of cobalt,
wherein the plated layer further comprises a third element,
wherein the third element is 1 to 20 wt % of phosphorus.

2. The electroplated bead wire having excellent oxidation resistance of claim 1, wherein
a thickness of the plated layer is 0.005 µm to 2.0 µm.

3. The electroplated bead wire having excellent oxidation resistance of claim 1, wherein
copper of the plated layer is formed by electroplating in a first electroplating bath, and
cobalt of the plated layer is formed by electroplating in a second electroplating bath after going through the first electroplating bath.

4. The electroplated bead wire having excellent oxidation resistance of claim 3, wherein
a plating solution used in the first electroplating bath and the second electroplating bath comprises at least one selected from cyanide, pyrophosphoric acid, chloride, sulfide, and hypophosphoric acid plating solutions.

5. The electroplated bead wire having excellent oxidation resistance of claim 4, wherein
a plating solution of the first electroplating bath is used as a metal salt of the copper,
a concentration of the metal salt of the copper is about 20 g/L to 150 g/L,
a plating solution of the first electroplating bath is used as a metal salt of the cobalt, and
a concentration of the metal salt of the cobalt is about 1 g/L to 20 g/L.

6. The electroplated bead wire having excellent oxidation resistance of claim 3, wherein
an electroplating temperature of the first electroplating bath and the second electroplating bath is 20° C. to 60° C.

* * * * *